(No Model.)

W. E. JONES.
BICYCLE SUPPORT AND LOCK.

No. 604,050. Patented May 17, 1898.

WITNESSES:
M. F. Boyle
J. B. Clautice

INVENTOR
Whitfield E. Jones
BY
Thomas Drew Stetson
ATTORNEY

UNITED STATES PATENT OFFICE.

WHITFIELD E. JONES, OF BROOKLYN, NEW YORK.

BICYCLE SUPPORT AND LOCK.

SPECIFICATION forming part of Letters Patent No. 604,050, dated May 17, 1898.

Application filed February 11, 1897. Serial No. 622,903. (No model.)

*To all whom it may concern:*

Be it known that I, WHITFIELD E. JONES, a citizen of the United States, residing in Brooklyn, Kings county, in the State of New York, have invented a certain new and useful Combination Stand and Lock for Cycles, which I shall sometimes refer to by the single word "stand," of which the following is a specification.

My invention is a combined stand and lock; and it consists in the simple, compact, and efficient construction hereinafter described and claimed.

The accompanying drawings form a part of this specification and represent what I consider the best means of carrying out the invention.

Figure 1:
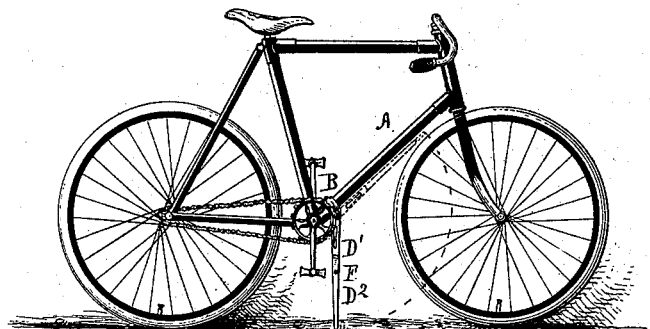
Figure 7:
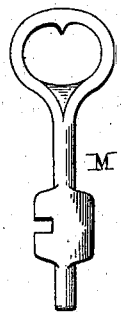
Figure 2:
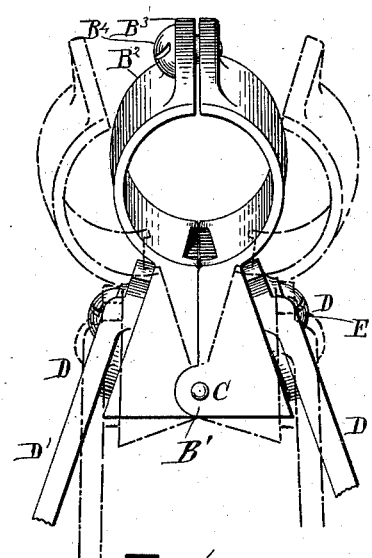
Figure 6:
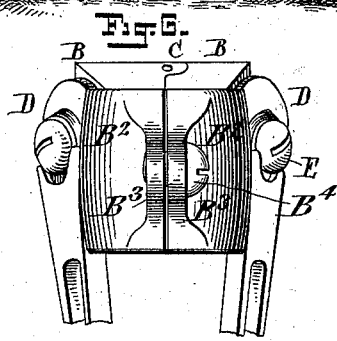
Figure 3:
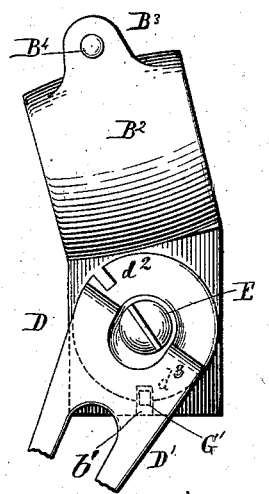
Figure 4:
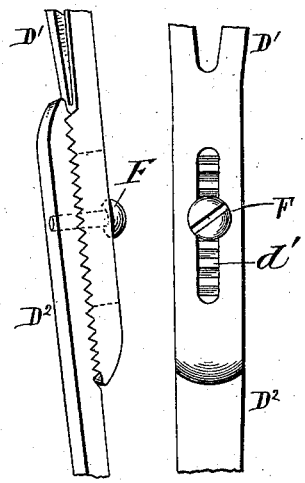
Figure 5:
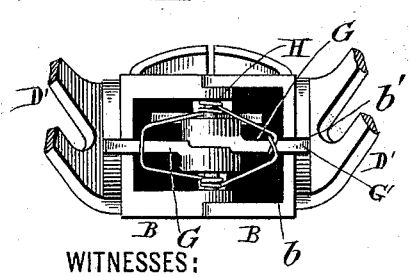

Figure 1 is a side view representing a bicycle having my improved stand attached and shown in its two positions by dotted lines and full lines. Fig. 2 is a rear view, on a larger scale, of the upper and more important parts. The open condition when it is being applied or removed is indicated in dotted lines. Fig. 3 is a side view of the parts shown in Fig. 2, clearly illustrating the arrangement of bolt-recesses. Fig. 4 is an inverted plan. Fig. 5 is a front view of the parts represented in the two preceding figures. Fig. 6 is a plan view, on a similar scale, of the improved stand, showing the converged position the legs occupy when folded up out of use. Portions are broken out to reduce the length of the figure. Fig. 7 is a side view of the key.

Similar letters of reference indicate corresponding parts in all the figures where they appear. I will use supernumerals when necessary to designate special portions of any part.

The main body of the device, which I style the "housing-clamp," comprises two sections B B, having lower overlapping ears B' B', which are pierced by the long pivot-bolt C, hinging the two sections together, so as to form a rectangular case or housing, through the interior $b$ of which the pin C extends longitudinally. Upon this pin the locking mechanism is mounted.

The sections B B present at their upper parts the hollow cylindrical clamp $B^2 B^2$, the members of which have the familiar top ears $B^3 B^3$, pierced by the screw $B^4$. The device may by these means be securely clamped to the lever-bar A of a bicycle-frame at about the point indicated in Fig. 1. The lateral faces of the lower portions of the sections are plane and converge toward the front, as shown in Figs. 2 and 5. The lower edge of each face has one deep notch $b'$. (See Fig. 4 and dotted line in Figs. 3 and 5.)

On each plane side is pivotally secured the flat circular head D of one of a pair of legs, which bears against the housing side, the leg being offset, as indicated in Fig. 2. The legs are each composed of an upper member D' and a lower member $D^2$, the former having a good width at the point of junction with the head. The upper member is adjustably secured to the lower by matching serrations $d$ on their contact-faces, the clamping being effected by a screw F, which is inserted through a vertical slot $d'$ in the upper member D' and is tapped in the lower member $D^2$. (See dotted lines in Fig. 6.)

By the construction immediately above described extensible legs are provided, which are spread apart at their lower ends to give a side support upon the ground and can be readily lengthened or shortened, according to requirement, and firmly engaged and clamped without liability of one slipping on the other. The edge of each head D has two recesses $d^2$ $d^3$, relatively arranged about as indicated in Fig. 3 and which are each adapted to register with the upper part of the adjacent rectangular notch $b'$ when the head makes a quarter-turn on its pivot E.

Two dogs G G, Fig. 4, of the shape indicated by the dotted lines in Fig. 5, are pivotally mounted on the pin C within the housing-space $b$. An arm G' of each is confined, but can move up and down in the corresponding vertical recess or deep notch $b'$ in the lower edge of its side of the housing. A suitably-disposed wire spring or springs H, Figs. 4 and 5, normally holds the dogs in the position shown in Fig. 5. A curved arm $G^2$ at the upper side of each dog is favorably disposed to receive the action of a key M, (see Fig. 7,) inserted through a keyhole $b^*$ in the front of the housing. (See dotted lines in Fig. 5.) A partial turning of this key will spread the ears, and thereby effect the depression of the arm G' of each dog. A stop or stops may be employed within the housing to properly limit the insertion of the key.

In use the device is attached to the lower frame-bar A, embracing the same by the clamps B² and inserting and tightening the screw B⁴. For traveling, the legs will be folded parallel with the under side of the bar A, as seen by dotted lines in Fig. 1. In such position the notch or rectangular recess $d^2$ of each head D will register with the corresponding recess $b'$, and the arm G' of the dog G at that side will be urged by the spring H into the recesses $d^2$, and the legs will thus be held in the folded position. While thus arranged they converge, as exemplified in Fig. 6, thus attaining a very compact arrangement and one in which the legs are of no effect. By introducing and turning the key M the dogs G will be operated to separate the arms G², and thus cause the arms G' to be depressed, and thus disengaged each from its notch in the head D, so that the legs drop by gravity or may be freely turned downward from the horizontal to the required position to serve as an efficient support—that shown in Figs. 1, 2, and 3. In this new position they will be rigidly held, as before, and will be, furthermore, locked. This is effected by the engagement of the arms G' each with the proper notch $d^3$ in the corresponding head D, that notch instead of the notch $d^2$ having been now brought to coincide with the notch $b'$. Each receives the arm G' of the corresponding dog so soon as such dog is liberated by the reverse turning and removal of the key. It will be observed that the vertically-inclined sides of the housing, operating in conjunction with the heads of the legs, cause the legs to spread, Fig. 2, when turned to a supporting position.

The device serves very effectually as a lock against the bicycle being ridden while thus conditioned. The machine would have to be lifted and carried bodily by any person not having a proper key and removing it without authority. For full security I rivet the ends of the leg screws E and also of the clamp-screw B⁴ to make it impossible to remove it except by proper tools at a shop. As against any attack by an unauthorized party the device is a permanent attachment of the machine.

From the foregoing description it will be readily understood that in addition to its many other advantages the attachment is comparatively light and involves but few parts. By making the pivots for the heads D in the form of strong screws and the legs D' D' sectional any injury to either member will only require a new leg part or section.

In the form of lock set forth the dogs G are independently acting, so that "picking" or tampering with the parts is rendered difficult.

Other constructions of locks will answer. Of course the edges of the keys and the wards of the locks should vary one from another, so that the proper individual key will be required to operate each.

The lower side of each half of the housing may be closed by a bottom formed integrally with the other parts or by a separately-formed piece riveted or otherwise reliably attached.

I claim as my invention—

1. In a combined stand and lock for cycles, having a housing-clamp provided with a key-opening and inclined sides and adapted for embracing the lower horizontal frame-bar, and locking mechanism within the housing including dogs G' G', the combination therewith of legs pivoted on the inclined sides to diverge when vertical and converge when horizontal, and a key for simultaneously operating the dogs for causing them to positively engage and lock both legs in either of the said two positions, substantially as specified.

2. In a combined stand and lock for cycles, having sections B B, pivotally connected, and constituting in connection with a screw B⁴, a clamp and housing, the latter having inclined divergent sides and a key-opening, and the former adapted for embracing the lower horizontal frame-bar, the combination therewith of legs pivotally turning on the inclined sides of the housing to spread and converge, and key-operated locking mechanism within the same for simultaneously and positively engaging and locking both legs in either of said two positions, substantially as specified.

3. In a combined stand and lock for cycles, having the sections B B, pivotally connected and recessed at their lower portions and constituting the clamp and housing, the latter having the key-opening and the former adapted for embracing the lower horizontal frame-bar, the combination therewith of circular heads D D, pivotally turning on the sides and each provided with two or more recesses $d^2$, $d^3$, and offset legs, and a key-operated locking mechanism including the dogs G G, oppositely projecting through the housing-recesses and arranged to positively engage the same and lock the legs in either of two positions, substantially as specified.

In testimony that I claim the invention above set forth I affix my signature in presence of two witnesses.

WHITFIELD E. JONES.

Witnesses:
J. B. CLAUTICE,
M. F. BOYLE.